Sept. 27, 1927.                    1,643,537
B. J. BASKERVILLE
OAT SPROUTER
Filed Sept. 14, 1923    2 Sheets-Sheet 1
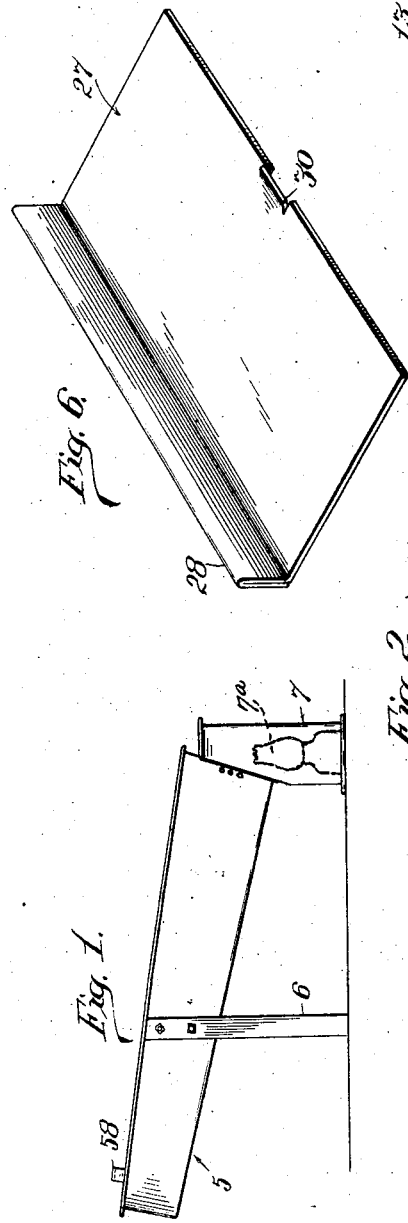
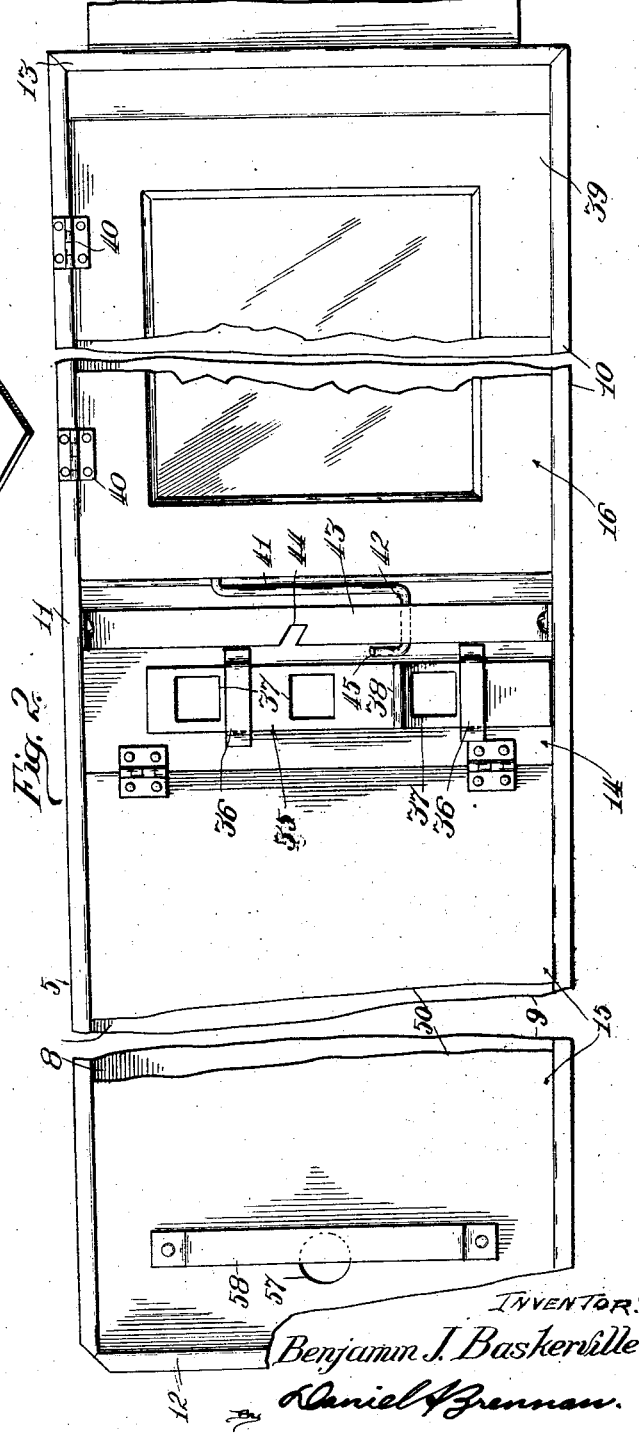
INVENTOR:
Benjamin J. Baskerville
By Daniel A Brennan.
Attorney

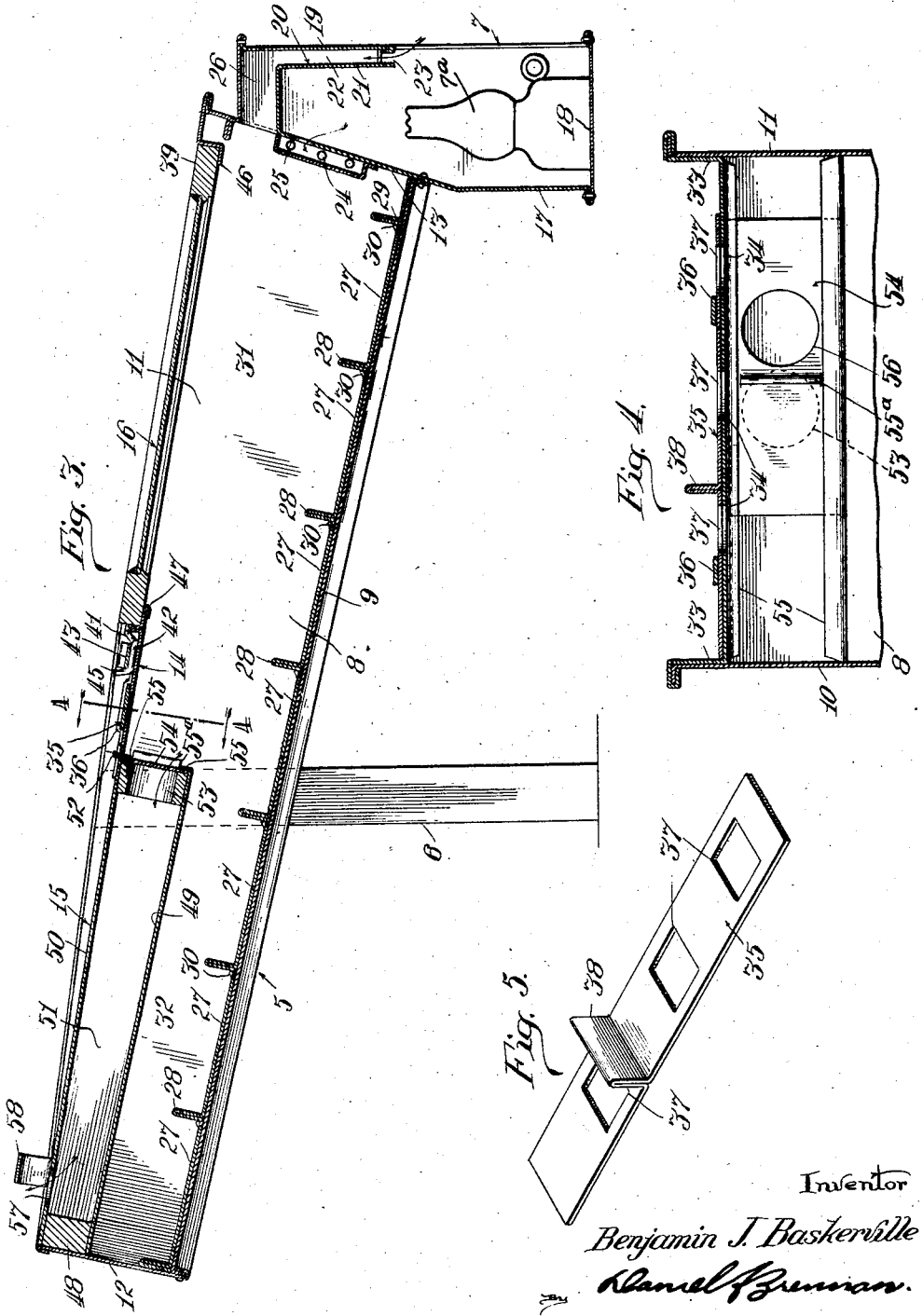

Patented Sept. 27, 1927.

1,643,537

UNITED STATES PATENT OFFICE.

BENJAMIN J. BASKERVILLE, OF JOLIET, ILLINOIS.

OAT SPROUTER.

Application filed September 14, 1923. Serial No. 662,667.

This invention relates in general to agricultural apparatus and more particularly pertains to an improved method of and means for treating seeds, more especially to the germination of seeds, and therefore belongs to that class of devices commonly known as seed sprouters.

The principal objects and advantages which characterize this invention reside in the provision of an improved method of sprouting seed or grain; the provision of an improved apparatus for sprouting seed or grain; the provision of an improved method of sprouting seed characterized by the application to the seed of heat and pressure during germination; the provision of an improved apparatus for sprouting seed characterized by the provision of means for applying heat and pressure to seed during germination; the provision of an improved method of sprouting seed by the application of both heat and pressure to the seeds in the early stages of germination and later the application of heat and light; and the provision of an improved apparatus for progressively treating seed in accordance with the method outlined herein.

This invention is further characterized by the provision of an improved apparatus for treating seed for sprouting which includes means for applying heat and pressure to the seed in the early stages of germination, and also including means for regulating the degree of heat; the provision of improved apparatus for sprouting seeds and grain by progressively, in the order named, applying hot air and physical pressure to the seed or grain, and then for permitting the application of hot or warm air and light; the provision of an apparatus of the character described wherein the housing is constructed whereby to give the growing plant or seed ample space; the provision of an apparatus of the character described wherein the heating device (where a lamp is employed) is so arranged with reference to an air inlet, that the products of combustion cannot reach the sprouting, or growing chambers, and wherein the temperature may be regulated to a nicety; and the provision of an apparatus of the character referred to which is simple in construction, and compact and therefore readily portable.

The foregoing and such further objects and advantages as may hereinafter appear or be pointed out, are attained in the structural embodiment illustrated in the accompanying drawings, wherein:

Figure 1 is a side elevational view of the device of this invention.

Figure 2 is a top plan view.

Figure 3 is a longitudinal vertical sectional view.

Figure 4 is a fragmentary transverse sectional view taken on line 4—4 of Figure 3.

Figures 5 and 6 are perspective views of details.

As previously explained, there is an improved method here involved including the steps of: placing the seed in water and then depositing the seed in a substantially closed chamber and then applying heat and pressure to the seed, then, as the seed germinates and just previous to sprouting, I move the tray containing the seed to a position wherein the pressure is released, but the heat continued and light admitted. The step of applying pressure and heat I find keeps the seed more moist during early development, and causes the individual plants to root together more rapidly. The method may be carried out in various ways, but I have developed a convenient apparatus for carrying out the method, and which I will now proceed to describe.

Referring more particularly to the drawings, and first to Figure 1, the sprouting device is indicated generally at 5, mounted on legs 6, and disposed in a generally inclined plane, a heating chamber 7 being connected to the sprouting device at the lower end thereof.

The sprouting device comprises an elongated chamber or housing 8, including a floor 9, side walls 10 and 11, upper and lower end walls 12 and 13, and a top wall composed of the fixed portion 14, and two hinged portions 15 and 16, the latter being transparent.

The heating chamber or lamp house 7 includes the wall 13 extended at 17, a floor 18, front wall 19, and a crown sheet or baffle 20 having a skirt portion 21 lying in spaced relation to the front 19 to afford a passageway 22 for air, said passageway having an inlet 23. The products of combustion from the heating device, such as an ordinary oil lamp 7ª, are permitted to escape to the flue 24, through an opening 25 in the wall 13, whence the gases pass to atmosphere through the ends of the flue for which the side walls 10 and 11 are perforated.

The space 22 communicates at 26 with the upper portion of the adjacent end of the housing 8, and thus heated air enters the passageway 22 and rises to the interior of the housing 8.

A plurality of seed carriers is placed in the housing 8 on the floor 9, such carriers conveniently taking the form of metal trays 27, (Figure 6), comprising each a flat portion which receives the moistened seed, and rests on the floor 9, in abutment with the adjoining tray. One end of the tray is provided with an upstanding flange 28, by which the tray may be conveniently handled. At the lower end of the housing 8, a false tray or abutment 29 is provided for the purpose of keeping the lowermost of the trays 27 spaced from the end wall 13, and flue 24, and thus facilitating removal of the lower tray without material disturbance of its contents. Each tray is provided with an upwardly bent tongue 30, which prevents the trays from sliding one under the other.

As will be seen from Figures 1 and 3, the housing 8 tapers in vertical cross-section, and by this structure a twofold function is accomplished, namely, the lower end of the housing, which forms the growing space or chamber 31, is deeper than the portion or germinating space or chamber 32, and thus gives the plant more room; and secondly, this arrangement brings the top wall closer to the floor over the chamber 32, so that the section 15 may more readily perform its compression function.

Reverting now to the top closures, and first to the fixed portion 14, this latter comprises a transversely arranged strip of sheet metal, set into the housing 8, and affixed to the side walls in any approved suitable manner, as at 33.

The section 14 is provided with a plurality of ports 34, the ports being in spaced relationship, and adapted to be closed by a shutter 35, slidable in cleats 36—36 on the strip 14, said shutter having a series of openings 37 complementally spaced with respect to the ports 34. The shuter is upset at 38 to afford a handle.

The closure 16 includes a frame 39, conveniently constructed of wood, mounted for upward opening on the hinges 40—40, said frame carrying a transparent panel for the purpose of admitting light to the plants and in order that the development may be observed.

The closure 16 is normally closed, and in order to retain same closed tightly a resilient arm 41 is pivoted in one rail of the frame 39, and said arm is provided with a hook portion 42, underlying a strap 43, fixedly secured to the walls 10 and 11. A notch 44 is provided in the strap 43, into which the end 45 of the arm 41 enters to retain the closure 16 in open position.

When in closed position, the closure 16 rests upon a flange 46, formed on the end wall 13, and a flange 47 formed on the section 14.

The closure section 15 comprises a frame 48, supporting inner and outer plates 49 and 50 in spaced relation to afford an air passage 51. The closure 15 is hingedly mounted by the provision of hinges 52, connecting said closure to the fixed section 14.

The passage 51 communicates with the interior of the chamber 31 by the provision of a port 53 in one end of the frame 48, a shutter 54 slidable in flanges 55—55 on the plates 49 and 50, and provided with a handle 55ª and an opening 56, serving to control flow of air through the passageway 51.

The passageway communicates with atmosphere by the provision of an outlet port 57 in the upper end of the plate 50. A handle 58 is provided upon said plate 50.

The closure 15 or presser or compression member is freely hingedly mounted, so that it may rest with its weight upon the contests of the trays immediately beneath it, and thus perform the function of a compression member as well as closure.

In carrying out the method here involved with the apparatus illustrated, the moistened seed content is placed in say the first upper three trays, to the left, as viewed in Figure 3. The closure 15 is opened for this purpose, and after the seed is in place, the closure 15 is permitted to rest upon the contents of the trays immediately beneath it.

A lamp 7ª or other heating device is then placed in the compartment 7 and lighted, the fumes passing off through the flue 24, and thereby heating the air entering inlet 23. Thence the air passes up along the top wall of the housing 8, and by manipulation of the shutters 35 and 54, passageway 51 may readily be regulated, and thereby the plants receive the proper treatment. As the separate groups of plants develop they may be removed from the lower end of the chamber 31. It is to be observed that while sufficient heat is applied to the seeds in the early stages of germination, they are, in effect, subjected to a pressure or inclosing effect, which together with moisture applied hastens their taking root.

While a specific structural embodiment has been illustrated, it will be readily appreciated that minor alterations may be made within the spirit and scope of the claims.

I claim:

1. In a seed sprouter, an elongated chamber including a germinating space and a growing space adjacent thereto, and a compression member in and confined to said germinating space.

2. In a seed sprouter, in combination a chamber adapted to contain seed in process of germination, means in said chamber for compressing such seed, and a growing chamber in communication with the first mentioned chamber.

3. A seed sprouter including an elongated housing having a growing chamber therein and a germinating space at one end of the housing of less height than the growing chamber, and means in said germinating space for placing seeds under compression therein.

4. In a seed sprouter, an elongated chamber including a germinating space and a growing space, a compression member in said germinating space, and means for artificially heating said compression member.

5. In a seed sprouter, an elongated chamber including a germinating space and a growing space, a hollow compression member in said germinating space, and means for admitting heated air to said growing space and to the interior of said compression member.

6. In a seed sprouter, an elongated chamber including a germinating space and a growing space, a hollow compression member in said germinating space, a source of heated air, and means for admitting and for regulating the ratio of heated air admitted to said growing space and to the interior of said compression member.

7. In a seed sprouter, an elongated chamber including a germinating space and a growing space, a hollow compression member in said germinating space, a heating device, means for admitting heated air from said heating device to said growing space and to the interior of said compression member, and means for excluding the products of combustion of said heating device from the sprouter.

8. In a seed sprouter, an elongated chamber including a germinating space and a growing space, a compression member in said germinating space, a heating device, means for admitting heated air from said heating device in predetermined ratio, to said growing space and to said compression member, and means for excluding the products of combustion of said heating device from the sprouter.

9. In a seed sprouter, an elongated chamber disposed in an inclined plane and including a germinating space and a growing space, a compression member in said germinating space, and means for moving the seeds seriatim from said germinating space to said growing space in a substantially uninterrupted sequence for propagating the seed.

10. A seed sprouter, in combination, a chamber disposed in an inclined plane and adapted to contain seed in process of germination, means for compressing such seed, and a growing chamber in communication with the first mentioned chamber.

11. In a seed sprouter, in combination, an elongated tapered housing supported in a generally inclined plane and provided at its lower end with an air inlet and a heating device, the upper half of said housing serving as a germinating chamber, a compression member in said germinating chamber, and means for admitting heated air to said compression member.

12. In a seed sprouter, in combination an elongated tapered substantially closed housing supported in a generally inclined plane and provided at its lower end with an air inlet and a heating device, the upper half of said housing serving as a germinating chamber, a compression member in said germinating chamber, and means for admitting heated air to said compression member.

13. In a seed sprouter, in combination, an elongated tapered housing supported in a generally inclined plane and provided at its lower end with an air inlet and a heating device, the upper half of said housing serving as a germinating chamber, a compression member in said germinating chamber, an air outlet for said housing, and a regulating closure for said outlet.

14. In a seed sprouter, in combination, an elongated tapered housing supported in a generally inclined plane and provided at its lower end with an air inlet and a heating device, the upper half of said housing serving as a germinating chamber, a compression member in said germinating chamber, an air outlet for said housing, a regulating closure for said outlet, and means for admitting heated air to said compression member.

15. In a seed sprouter, in combination, an elongated tapered housing supported in a generally inclined plane and provided at its lower end with an air inlet and a heating device, the upper half of said housing serving as a germinating chamber, a compression member in said germinating chamber, a controlled air outlet for said housing, and a controlled air inlet to said compression member.

16. In a seed sprouter, in combination, an elongated tapered housing supported in a generally inclined plane and provided at its lower end with an air inlet and a heating device, the upper half of said housing serving as a germinating chamber, means for compressing seed in said germinating chamber, and means for admitting heated air to said germinating chamber.

17. In a seed sprouter, a housing having a germinating chamber, a growing chamber, and a displaceable compression member for the germinating chamber for closing same and for compressing the seed in said chamber, artificial heating means, and said compression member being hollow and controllably receiving artificially heated air from said growing member.

18. In a seed sprouter, an elongated chamber including a germinating space and a growing space, a compression member in said germinating space, means for admitting heated air to the growing space, and regulatable means for heating said compression member.

19. A seed sprouter, in combination, a chamber disposed in an inclined plane and adapted to contain seed in process of germination, means for compressing such seed, and a growing chamber in communication with the first mentioned chamber.

In testimony whereof I affix my signature

BENJAMIN J. BASKERVILLE.